US009278468B2

(12) United States Patent
Wheat et al.

(10) Patent No.: US 9,278,468 B2
(45) Date of Patent: Mar. 8, 2016

(54) ELEVATOR BUCKETS AND METHODS OF MAKING SUCH BUCKETS

(71) Applicant: T.F. & J.H. Braime (Holdings) PLC, Leeds (GB)

(72) Inventors: Jonathan Norman Wheat, Peoria, IL (US); Pietro Azzolina, Leeds (GB)

(73) Assignee: T.F & J.H. Braine (Holdings) PLC, Leeds (GB)

( * ) Notice: Subject to any disclaimer, the term of this patent is extended or adjusted under 35 U.S.C. 154(b) by 0 days.

(21) Appl. No.: 14/120,335

(22) Filed: May 14, 2014

(65) Prior Publication Data

US 2014/0339055 A1    Nov. 20, 2014

(51) Int. Cl.
*B65G 17/36* (2006.01)
*B29C 45/26* (2006.01)
*B65G 17/12* (2006.01)
*B29L 31/00* (2006.01)

(52) U.S. Cl.
CPC .......... *B29C 45/2673* (2013.01); *B65G 17/126* (2013.01); *B29L 2031/712* (2013.01); *B65G 17/36* (2013.01)

(58) Field of Classification Search
CPC ................ B29C 45/2673; B29C 45/26; B29C 2045/2677; B29C 2045/2697; B65G 17/36; B65G 17/126; B65G 17/365; B65G 2201/04; B65G 2812/02742; B65G 2812/02772
USPC .................................................. 198/701–714
See application file for complete search history.

(56) References Cited

U.S. PATENT DOCUMENTS

| 4,246,999 | A * | 1/1981 | Bryant et al. ................. 198/713 |
| 5,262,116 | A * | 11/1993 | Von Holdt, Sr. ........... 264/297.2 |
| 7,097,027 | B1 * | 8/2006 | Chen ............................. 198/713 |
| 7,179,076 | B1 * | 2/2007 | Vanderwoude et al. .. 425/192 R |
| 7,698,839 | B1 * | 4/2010 | Phillips et al. .................. 37/444 |

* cited by examiner

*Primary Examiner* — Mark A Deuble
(74) *Attorney, Agent, or Firm* — R. Scott Kimsey, Esq.; Klein DeNatale Goldner, et al.

(57) ABSTRACT

An elevator bucket mold combination comprising a common recess and two inserts, namely a first insert and a second insert, separately associable as required with the common recess using respective reciprocal couplings to the common recess without the other, a first insert defining a first bucket mold shape with the common recess while when the second insert is associated with the common recess only a desired part of the first bucket mold shape is provided as a second bucket mold shape.

1 Claim, 4 Drawing Sheets

ELEVATOR BUCKETS AND METHODS OF MAKING SUCH BUCKETS

RELATED APPLICATIONS

This Application claims priority of U.K. Patent Application No. 1308636.8, filed May 14, 2013 and entitled "Elevator Buckets and Methods of Making Such Buckets," and incorporated herein by reference.

BACKGROUND OF THE INVENTION

1. Field of the Invention

This invention relates generally to elevator buckets and methods of making such buckets as used with conveyor belts to raise such materials as grain and other commodities.

2. Background

Commodities such as grain require movement during storage and transportation. A common manner of movement is via conveyor belts but when a lift in height is needed particularly over a short distance or vertically then buckets are attached to the conveyor to provide an elevator. It may be thought that bigger buckets will mean that more capacity can be carried and/or larger commodity particle sizes may be accommodated so generally large-ish standard bucket sizes are defined. However, it will also be understood that smaller so called low profile buckets may be provided which allow more buckets for unit length of conveyor or elevator so letting the elevator or conveyor run at higher speeds so increasing capacity with lighter loads.

Hitherto low profile buckets have been made by taking a standard bucket and machining/manually cutting the standard bucket down to a low profile size. It will be understood it is easier to cut down than build up a sufficiently robust bucket but the costs in time and wasted materials are high. It will also be understood providing a separate mould for both standard and low profile sizes will be too expensive and then there will be the additional costs of mould change over time with lost production and safe storage of each mould.

SUMMARY OF THE INVENTION

In accordance with aspects of the present invention there is provided an elevator bucket mould combination comprising a common recess and two inserts, namely a first insert and a second insert, separately associable as required with the common recess using respective reciprocal couplings to the common recess without the other, a first insert defining a first bucket mould shape with the common recess whilst when the second insert is associated with the common recess only a desired part of the first bucket mould shape is provided as a second bucket mould shape.

The desired part may be an outlined surface of the first bucket mould shape.

There may be more than two inserts for respective desired parts of the first bucket mould shape as respective further bucket mould shapes.

The respective reciprocal couplings may be consistent and/or the same with all inserts. The first bucket mould shape may have a back wall and a front scoop wall, the first bucket mould shape configured whereby in use the shape may provide a moulded bucket which when balanced or mounted may provide a back wall substantially upright or biased to such an upright disposition. The back wall when balanced may have an upper edge above an upper edge of the front scoop wall.

The back wall in the second bucket mould shape may have an upper edge substantially level with a front edge of the front scoop wall.

The front scoop wall of the first bucket mould shape and of the second mould bucket may be substantially the same length and/or curvature.

The angle between the front scoop wall and back wall in the first bucket mould shape and the second bucket mould shape may be substantially the same.

The wall thickness of the front scoop wall, the back wall and side walls between them in the first bucket mould shape and the second bucket mould shape may differ to provide a desired, and normally consistent, centre of gravity with the same material used to form a bucket in use.

The inserts may include features to allow weights to be attached to a bucket formed in use from the first bucket mould shape or the second bucket mould shape.

Also in accordance with aspects of the present invention is a bucket formed using an elevator bucket mould as described above.

Further in accordance with aspects of the present invention there is provided a method of forming an elevator bucket using a bucket mould as described above where the method includes combining a desired insert with the mould recess dependent upon a choice of material to be used to form an elevator bucket whereby a bucket of the desired profile parts can be formed relative to a standard bucket size consistent with the first bucket mould shape.

BRIEF DESCRIPTION OF THE DRAWINGS

Embodiments of the invention will now be described by way of example only with reference to the accompanying drawings in which.

DETAILED DESCRIPTION OF THE INVENTION

Elevator buckets are used with conveyor systems and the like to lift typically particulate and granular matter such as grain, pulses and rice. As well be appreciated the rate of lifting in terms of weight will depend upon the size, number and distribution of elevator buckets but also the rate of movement of the buckets; generally the faster the rate of movement and the more buckets per unit length the faster the lift rate. A standard or first bucket size and configuration is defined to accommodate expected conditions and commodities to be moved but where desirable such as with lighter, more free flowing and smaller particulate matter an alternative low profile or second bucket size would be preferred comprising only a part of the standard or first bucket outline or profile. This second profiled bucket size is traditionally made by forming the standard first size bucket then machining/cutting that down to the second profiled size. In this way positioning of mountings in the buckets of either size can be assured without the need for two different moulds which would need change over time between batches. Nevertheless machining/cutting of standard buckets to provide profiled buckets requires time and also is wasteful of material removed.

It will be understood that the elevator buckets made need to all fit upon standardised mountings and fixtures so in broad terms the first bucket shape is partly removed within its outline and structure relative to that standard first bucket shape to provide a second bucket shape.

Figure 1:
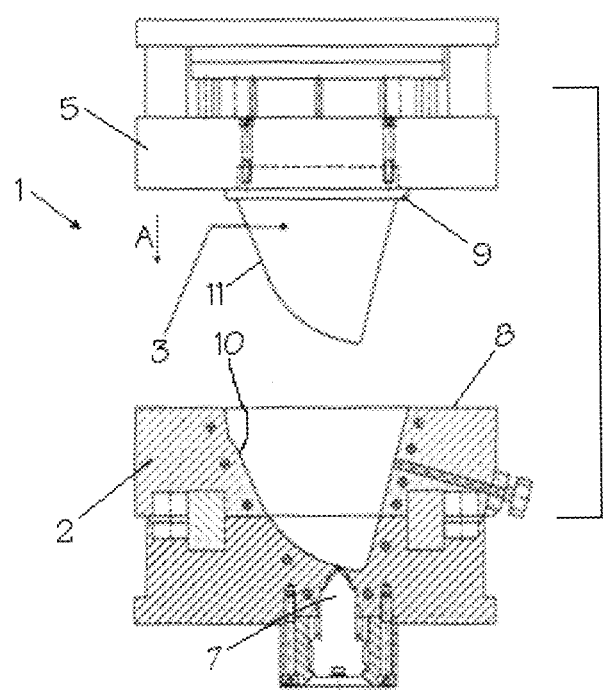
FIG. 1 is a cross-sectional illustration of an elevator bucket mould arrangement with regard to a mould recess and a first insert to provide a first bucket mould shape when associated together.
Figure 2:
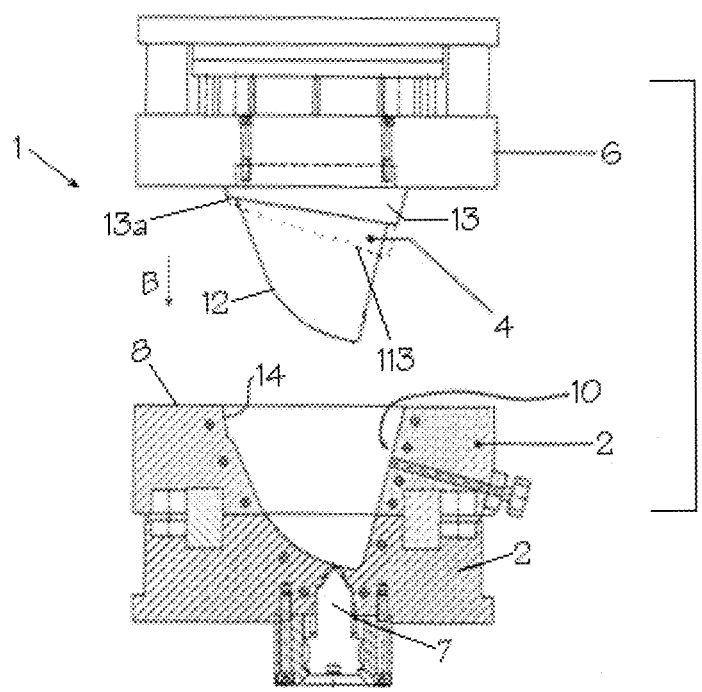
FIG. 2 is a cross-sectional illustration of an elevator bucket mould arrangement with regard to the mould recess shown in FIG. 1 and a second insert to provide a second bucket mould shape when associated together.

FIG. 1 and FIG. 2 illustrate an elevator bucket mould arrangement 1 in accordance with aspects of the present invention. A common recess mould 2 is provided which defines the outline of a bucket when formed with a first insert 3 or with a second insert 4 located within a recess 10 of the mould 2. The inserts 3, 4 have fixings in abutment portions 5, 6 to allow them to be secured to the recess mould 2 so that a first bucket mould shape and a second bucket mould shape are respectively formed as required by simply locating the inserts 3, 4 in to association with the recess 10 in the mould 2. It will be appreciated that the recess mould 2 could as illustrated be located below but in some circumstance the mould 2 could be above the inserts 3, 4 or the inserts 3, 4 and recess 10 could be upon their side or laterally disposed dependent upon the necessities for the moulding process such as moulded material flow as inject by a nozzle 7 and bleeds to indicate satisfactory fill and mould forming of buckets. In a preferred orientation or embodiment, contrary to the depiction in FIG. 1 and FIG. 2, the mould 2 and the inserts 3, 4 would be presented with the mould 2 above and the inserts 3, 4 below so that the mouldable material is injected from above such that flow and movement is assisted by gravity for material distribution and flow advantages.

Normally there will be two inserts 3, 4 but it will be understood that more inserts could be provided with each proportionately shaped compared to the standard full sized or first bucket mould shape to give more bucket mould shapes as required. In FIG. 1 it will be noted that the insert 3 in assembly and association will move in the direction of arrowheads A so that the abutment part 5 engages a reciprocal part 8 of the recess mould 2. The association may be simply moulded upon pressure in a mechanical press arrangement or simple weight and/or actual specific fixings/clamps to hold the recess mould 2 and insert 3 with abutment part 5 together. In any event when the recess mould 2 and insert 3 are together then a first elevator bucket mould shape is formed in a void between them. Mouldable and normally plastics material is then injected into the void defining the first bucket mould shape to form a standard bucket which can then be removed as required.

In FIG. 1 a lip or edge 9 lodges with the recess 10 to provide location, a seal and some register between a shaped recess 10 in the mould 2 and the insert 3. Once assembled a mould surface 11 of the insert 3 is presented adjacent the recess 10 so that the void between them defines the first bucket mould shape so that a bucket can be formed therein.

In FIG. 2 the common recess mould 2 remains but in order to provide a second bucket mould shape the insert 4 is moved in the direction indicated by arrowheads B such that it is located within the recess 10 to provide the second bucket mould shape in a void between the recess 10 and the insert 4. As previously, the insert 4 and the mould 2 are held in association such that a mouldable material can be injected through the nozzle 7 to form the bucket as required and once formed the bucket can be removed. A mould surface 12 of the insert 4 is adjacent the recess 10 to provide the void which defines the second bucket mould shape when the recess mould 2 and insert 4 are registered in association. To facilitate such association a lip or collar edge 13 engages with upper or mouth portions 14 of the recess 10 to provide location, a seal and register between the recess 10 and the insert 4. The lip or collar 13 can also be considered to define the truncation or change in shape of the second bucket mould shape compared to the first bucket mould shape. The second bucket mould shape is essentially the same in like for like sections as the first bucket mould shape but with predetermined sections removed so that installation of a bucket in accordance with the second bucket shape will be the same as the first bucket shape in terms of mountings to a conveyer and the presentation from the conveyor the same for each shape.

Figure 3:
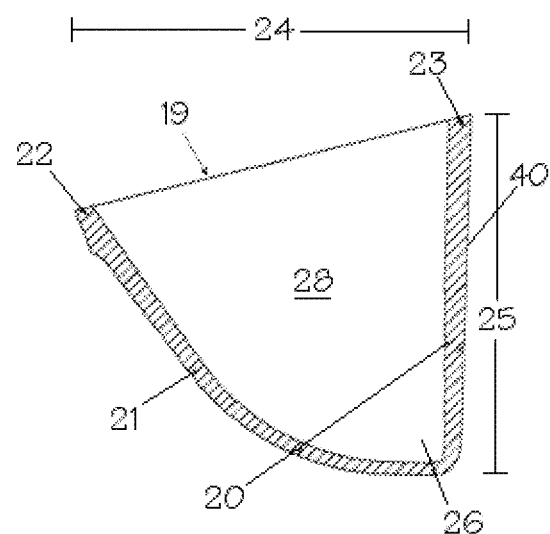
FIG. 3 is a cross-sectional view of a standard bucket formed in accordance with the first bucket mould shape; and, FIG. 4 is a cross-sectional view of a profiled bucket formed in accordance with the second bucket mould shape.
Figure 4:
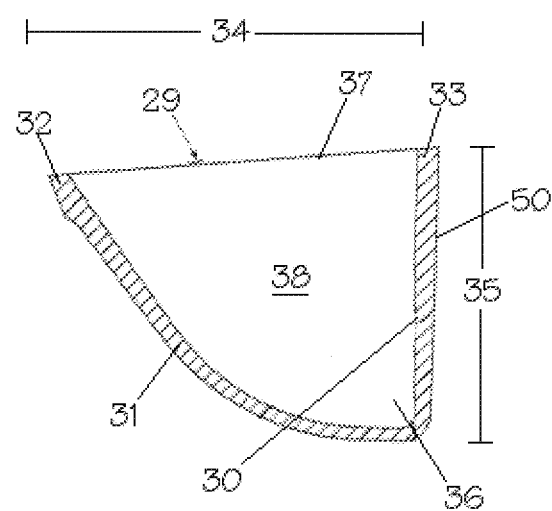

FIG. 3 and FIG. 4 respectively illustrate in cross-section the first or standard bucket shape 19 as moulded (FIG. 3) and the second or profiled shape 29 as moulded (FIG. 4). Each shape 19, 29 is designed to provide a back wall 20, 30 with a front scoop wall 21, 31. The configuration and shaping of the front scoop wall 31 is substantially consistent with the front scoop portion 21 but the back wall 30 is truncated relative to the back wall 20. It will be understood that at each end of the moulded bucket a side or end wall 28, 38 is provided and this too will be truncated relative to an upper edge connection between a front edge 22 with a rear edge 23 in the first bucket shape 19 and front edge 32 with rear edge 33 in the second bucket shape 29.

It will be noted that the lip or collar 13 part of the insert 4 effectively displaces the shaping of the second bucket mould shape so that a part of the void which defines the first bucket mound shape is filled or blanked off with the lip or collar 13. Thus, the second bucket mould shape is proportionately the same as the first bucket mould shape but truncated in size in this aspect.

Buckets are designed to provide performance in use so are balanced and weighted to achieve that performance with a particular elevator or conveyor system or set up. It will be understood that each bucket will have a weight and that a set of buckets on an elevator system will define a considerable part of system weight which must be driven around in addition to the load so that even when counter-balancing effects are taken into account with the up drive and gravitation down fall the weight of each bucket will be a significant design criteria. In such circumstances the bucket will generally be made from a suitable robust material such as a plastics material with a wall thickness sufficient for purpose. The present elevator bucket mould arrangement is designed normally so that whichever insert 3, 4 is located within the recess 10 a consistent wall thickness is achieved for balance and performance in use.

It will be noted that the front edges 22, 32 are slightly thicker than the remainder of the bucket wall as these edges 22, 32 will tend to suffer greater wear and tear. It will also be understood where the buckets 19, 29 are used as scoops into a mound or body of commodity such as grain then these edges 22, 32 must 'cut' into the commodity to scoop the commodity up so that it can be lifted in use. Similarly the buckets may need to tilt consistently to spill or release the commodity once lifted so balance of the bucket may be important. As illustrated in FIG. 3 and FIG. 4 typically the buckets 19, 29 will be balanced with the back wall 20, 30 substantially upright and the front scoop wall 21, 31 projecting forwards. Thus, the buckets 19, 29 may be similarly balanced with a width 24, 34 substantially the same so that performance of the respective buckets 19, 29 will be consistent in operation as well as with mountings to the conveyor/elevator system and with regard to capacity etc. and with mounting length/spacing defined by the depth 25, 35 of the back walls 20, 30.

It will be noted that the back walls 20, 30 are connected to the front walls 21, 31 at an angle 26, 36 which is substantially the same so again ensuring some consistency of performance and configuration between the buckets 19, 29. It will be understood that elevator bucket designs and shape have been known for a number of years in terms of capacity and performance so that generally a degree of consistency is desirable so that the other variables in terms of specification for a particular application are more manageable. The bucket will normally need to operate in confined spaces so maintaining an outline package shape enables easier consideration as to how the bucket will operate. For example as indicated above the outward projection distance 24, 34 for each bucket 19, 29 will be substantially the same so in terms of scoop reach or drop area into the bucket the performance will be the same and consideration of fouling with other elements and machinery along the elevator path will be the same. This is one of the reasons that machining a standard size bucket to a profiled bucket size has been so popular with prior approaches. Maintaining the consistency with separate moulds may be difficult whilst with aspects of the present invention essentially the same parts of the recess 10 for the standard or first bucket mound shape and so as mounded standard bucket also form the similar reciprocal parts of the profiled or second bucket shape and so as moulded profiled bucket.

It will be noted in FIG. 1 and FIG. 2 that the collar or edge 13 is effectively a tapering or truncated wedge section extending from one side 13a which has a depth substantially consistent with that of the ring or collar 9 for the standard or first bucket mould shape. The depth on the other side effectively blanks off a proportion of the opposed recess 10 so that the second or profiled bucket mould shape in terms of the back wall is reduced or truncated within the mould outline profile of the first or standard bucket mould shape. The taper or wedge between the side 13a for the front edge 32 and the other side for the rear edge 33 then defines the top 37 of the side walls 38. Clearly being directly formed the profiled bucket 29 will not have machined or saw cut edges made by cutting down in accordance with prior approaches so any potential weakening by such procedures is eliminated along with a need to tidy and make good such burring. It will be understood if used with food commodities and grain any cracking or the possibility of metal or plastic burring falling into the commodity transported might be a dangerous problem. It will also be understood to a greater extent there will be more consistency between buckets particularly profiled buckets and some de-skilling of the machining/cutting processes needed for production of profiled elevator buckets.

It will be understood that standard or first bucket shape elevator buckets can be stacked together along with profiled or second bucket shape elevator buckets rendering storage and transportation easier.

As indicated above change over times between inserts 3, 4 may be a significant factor but typically the assemblies including the inserts 3, 4 and the abutment surfaces 5, 6 may be on a carriage so the respective assembly can be lifted or lowered, shifted laterally and then lifted or lowered into the recess 10 as necessary with a power press to retain position or some form of fixing or clamping or a combination to form the elevator bucket mould prior to forming each bucket. It will be understood that the insert assemblies are normally the moving parts of the mould arrangement so that buckets can be removed at the end of each moulding process cycle but alternatively the recess mould 2 may be movable away from the insert assemblies. The insert assemblies or possibly the recess mould 2 may be provided on a carousel. It will also be understood that assemblies may be formed with a number of recesses 10 and reciprocal inserts 3, 4 so that a number of elevator buckets can be formed at the same time.

Easy and convenient assembly of elevator buckets to an elevator system is important with regard to aspects of the present invention. The mountings for the buckets will tend to be on a rear surface 40, 50 of the respective back walls 20, 30. Thus in the truncation process of the rear surface some of the mountings in the rear or back walls 20, 30 will be retained in the same position in the second bucket mould shape so that same mountings and fixings to the conveyor or elevator can be used.

Normally the collar or edge 13 will be integrally formed with the remainder of the insert assembly so will provide a consistent second bucket mould shape. However, it may be possible to add as shown by broken line 113 an additional element or elements to alter the shape and size of the collar or edge 13 and so the eventual second bucket mould shape. It may also be possible to provide a collar or edge which pivots about the end 13a so again altering the configuration of the collar or edge in use and so the bucket mould shape used to provide a profiled bucket after moulding.

As the profiled buckets in accordance with aspects of the present invention will be originally made rather than machined or cut down as in the past it will be understood that may be possible to use different materials to from the profiled buckets compared to the standard buckets. Furthermore, in terms of balance and centre of gravity issues the insert 4 and the like may be arranged to adjust the wall thickness inwardly at various locations to change weight distribution marginally or to allow inward ribbing or provide locations for fixing balancing weights etc. The outer profile and outline of the standard and profiled bucket is set by the common recess 10 and the insert 4 defines which parts of that recess 10 are moulded to in order to create buckets.

Normally the buckets will be formed by an injection moulding process but other techniques could be used including pressing a pre-cursor blank or partially formed bucket in a bucket mould arrangement in accordance with aspects of the present invention giving the possibility of two part moulding techniques of different material segments at the edges and mountings for wear and softer/more durable materials in the bulk of the bucket formed.

It will be appreciated by those skilled in the art that any number of combinations of the aforementioned features and/or those shown in the appended drawings provide clear advantages over the prior art and are therefore within the scope of the invention described herein.

Having thus described the preferred embodiment of the invention, what is claimed as new and desired to be protected by Letters Patent includes the following:

1. An elevator bucket mould combination comprising a common recess and two inserts, namely a first insert and a second insert, separately associable as required with the common recess using respective reciprocal couplings to the common recess without the other, a first insert defining a first bucket mould shape with the common recess whilst when the second insert is associated with the common recess only a desired part of the first bucket mould shape is provided as a second bucket mould shape,
    wherein the first bucket mould shape has a back wall and a front scoop wall, the first bucket mould shape configured whereby in use the shape provides a moulded bucket which when balanced or mounted provides a back wall substantially upright or biased to such an upright disposition, and further wherein a back wall in the second bucket mould shape has an upper edge substantially level with a front edge of the front scoop wall.

* * * * *